United States Patent [19]  [11] Patent Number: 4,804,060
Iritani  [45] Date of Patent: Feb. 14, 1989

[54] FRAME TYPE TRACTOR
[75] Inventor: Hirofumi Iritani, Sakai, Japan
[73] Assignee: Kubota Limited, Osaka, Japan
[21] Appl. No.: 104,182
[22] Filed: Oct. 5, 1987
[30] Foreign Application Priority Data Nov. 4, 1986 [JP] Japan .................................. 61-263320
Nov. 21, 1986 [JP] Japan .................................. 61-279381
Dec. 8, 1986 [JP] Japan ............................ 61-188973[U]

[51] Int. Cl.⁴ .......................................... B60K 17/34
[52] U.S. Cl. .................................. 180/233; 180/240; 180/900
[58] Field of Search ........................ 180/240, 233, 900

[56] References Cited
U.S. PATENT DOCUMENTS 2,477,252  7/1949  Hutchings .......................... 180/900
4,506,756  3/1985  Bergous ............................. 180/900
4,574,910  3/1986  Miki et al. ......................... 180/900
4,691,802  9/1987  Ishimori et al. ................... 180/900
4,723,623  2/1988  Teraoka et al. .................... 180/900

FOREIGN PATENT DOCUMENTS 664913  6/1964  Italy ................................... 180/240
58-132783  9/1983  Japan .
61-160365  7/1986  Japan ................................ 180/900

Primary Examiner—John A. Pekar
Attorney, Agent, or Firm—Edwin E. Greigg

[57] ABSTRACT

A frame type tractor comprising an engine in a front portion, a transmission case in a rear portion thereof, a transmission shaft extending from the engine to the transmission shaft, and a front wheel drive shaft extending from the transmission case to a front wheel axle. The transmission shaft and front wheel drive shaft are connected to lower positions of the transmission case. An operator's step is mounted over the transmission shaft and front wheel drive shaft.

5 Claims, 3 Drawing Sheets

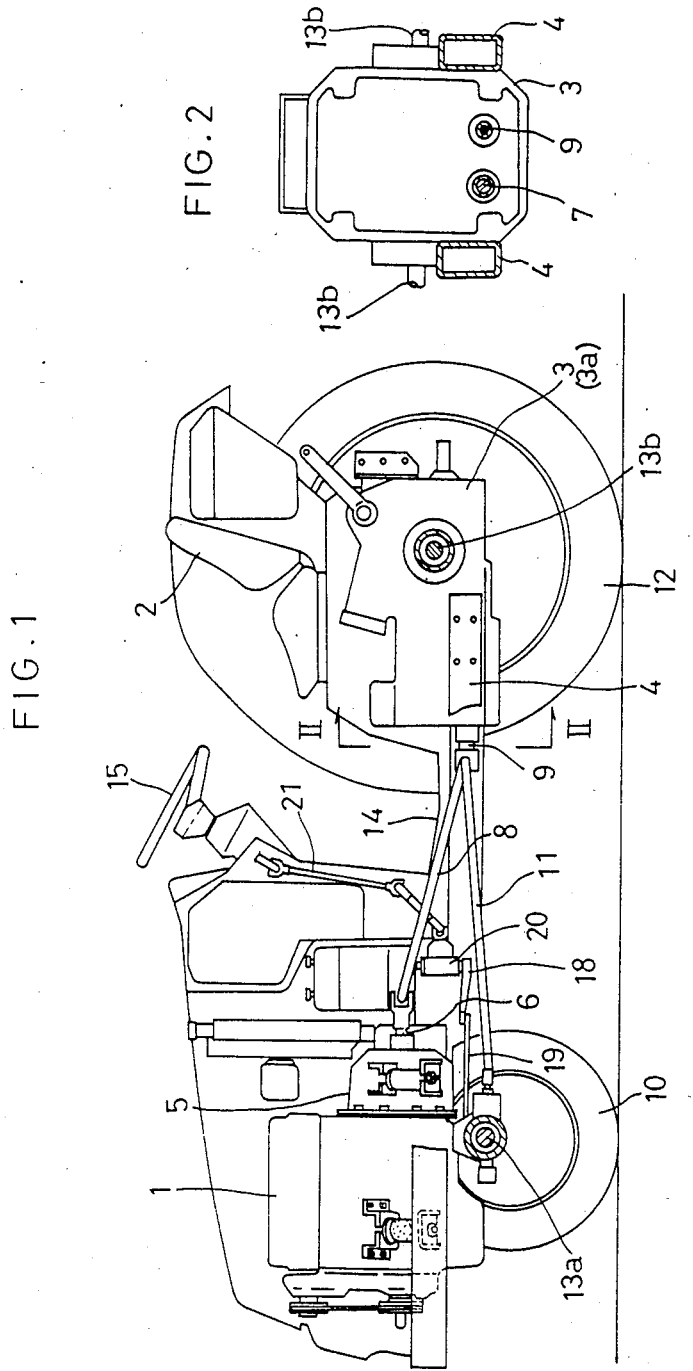

FRAME TYPE TRACTOR

BACKGROUND OF THE INVENTION (1) Field of the Invention

The present invention relates to a frame type four wheel drive tractor wherein an engine and a transmission mounted on a front and a rear portions of vehicle frames, respectively, are operatively interconnected through a transmission shaft, and the transmission and front wheels are operatively interconnected through a front wheel drive shaft.

(2) Description of the Prior Art

A known example of four wheel drive tractor of this type is disclosed in U.S. Pat. No. 4,574,910 wherein a front wheel drive shaft extends horizontally and a transmission shaft also extends horizontally above the front wheel drive shaft. A step for the operator is disposed above the transmission shaft.

It is necessary to provide a large and flat step for improving operational efficiency of the operator. Furthermore, a low level step is necessary for the operator to board and alight from the vehicle with ease. However, the step should not be lowered at the cost of the level of the vehicle from the ground or, specifically the level of the front wheel drive shaft from the ground. This is because the tractor of this type has often has a working implement such as a mower installed in a lower middle portion thereof and often travel rough terrains, which requires a sufficient clearance to be secured for the front wheel shaft which is positioned in the lowermost portion of the center of the vehicle. However, it is difficult to obtain a fully satisfying result in the foregoing conventional tractor due to limitations caused by the transmission shaft and front wheel drive shaft.

A further example of conventional tractor is disclosed in Japanese Utility Model Laying-open No. 58-132783, which has a gearbox of a front wheel steering mechanism projecting above the step. This structure makes a space for freedom of the driver's feet narrow, as a result of which, the operational efficiency is decreased and positional limitations are given to operation pedals.

SUMMARY OF THE INVENTION

The object of the present invention is to provide a frame type tractor wherein a step is flat and at a low level, and at the same time a vehicle body has a sufficient height above the ground.

The above-mentioned object is achieved by a frame type tractor comprising vehicle frames, an engine mounted on a front region of the vehicle frames, a transmission case housing a transmission and mounted on a rear region of the vehicle frames, a transmission shaft for operatively connecting the engine to the transmission, front and rear wheels driven by power changed by the transmission, the front wheels being steerable, a steering mechanism for the front wheels, and a front wheel drive shaft for operatively connecting the transmission to the front wheels, wherein the transmission shaft and front wheel drive shaft extend from a lower region of the transmission case through a position below a step for the operator.

According to this structure, the transmission shaft is at the same level adjacent the engine as in the conventional structure, but is at a lower level adjacent the transmission than in the conventional structure. As a result, the step is positioned at a lower level and can be flat at least in a region adjacent the transmission, although slightly rising in a region adjacent the engine. The level of the front wheel drive shaft of course is not lowered compared with the conventional structure.

In a preferred embodiment of the present invention, the engine and the transmission shaft are interconnected by a gear drive device, and the transmission shaft and front wheel drive shaft are horizontally arranged at substantially the same level from the ground throughout the length thereof. This structure realizes the step which is at a lower level than in the conventional construction and is flat over a whole range thereof.

Another preferred embodiment has a gearbox of the steering mechanism disposed in an intermediate space formed by the transmission shaft and the front wheel drive shaft. This structure prevents the gearbox from extending to a position above the step, or the whole step from being elavated when an attempt is made to eliminate the extending portion.

Consequently, a large space is secured for the operator's feet, which results in an improved comfort and operational efficiency for the operator, and in less positional limitations of the operation pedals. These effects are obtained only when the gearbox is positioned downwardly of the transmission shaft. Being in a lower position than the front wheel drive shaft, the gearbox is at substantially the same level as or at a lower level than a front axle case, which makes the overall level from the ground low. This structure increases the danger of colliding with obstacles when crossing them, but such possibility can be decreased by setting the gearbox in a vertically intermediate space between the transmission shaft and front wheel drive shaft.

Other objects and advantages of the present invention will be apparent from the following description.

BRIEF DESCRIPTION OF THE DRAWINGS

FIG. 1 is a side view in vertical section illustrating a tractor according to the present invention, FIG. 2 is a partial section taken on line II—II of FIG. 1.

DESCRIPTION OF THE PREFERRED EMBODIMENT

Figure 3:
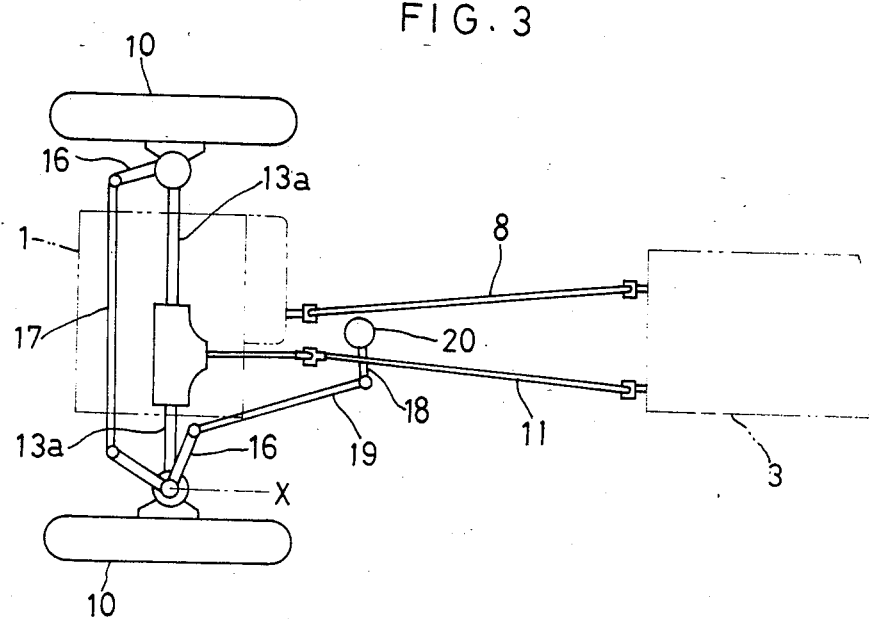
FIG. 3 is a schematic plan view illustrating a transmission structure of the tractor according to FIG. 1.

As shown in FIG. 1, a tractor comprises an engine 1 disposed in a front portion thereof, and a propelling transmission case 3 disposed downwardly of a driver's seat 2 which is mounted on a rear portion of the tractor. The engine 1 and transmission case 3 are interconnected through a pair of right and left vehicle frames 4. A clutch output shaft 6 extending rearwardly from a clutch housing 5 attached to a rear wall of the engine 1 is connected through a transmission shaft 8 to a transmission input shaft 7 disposed in a lower portion of a front wall of the transmission case 3 housing a transmission 3a. A universal joint is utilized in each coupling portion. As shown in FIG. 2, an output shaft 9 for front wheels is provided laterally of the input shaft 7 in the front wall of the transmission case 3, and is connected to a front wheel axle 13a through a front wheel drive shaft 11 for transmitting power to front wheels 10. An axle 13b for rear wheels 12 extends through opposite lateral sides of the transmision case 3.

In the tractor of the present invention, a step 14 is defined adjacent and upwardly of the input shaft 7 of the transmission 3a and a steering wheel 15 is provided forwardly of the driver's seat 2, which steering wheel is one of the elements of a front wheel steering mechanism.

The front wheel steering mechanism will be described in detail hereafter referring to FIGS. 1 and 3.

Knuckle arms 16 are pivotably disposed about pivoting points X of the respective front wheels 10. The pair of right and left knuckle arms 16 are interconnected through a tie rod 17. One of the knuckle arms 16 is bell-cranked and operatively connected to a lower portion of a gearbox 20 through a pitman arm 18 and a drag link 19. The gear box 20 is further connected at an upper portion thereof to the steering wheel 15 through a steering link mechanism 21. These elements constitute the front wheel steering mechanism for transmitting the movement of the steering wheel 15 to the front wheels 10.

As seen from FIG. 1, the gearbox 20 is mounted at a vertically intermediate position between the transmission shaft 8 and the front wheel drive shaft 11, so that the gearbox 20 does not extend to a position over the step 14. This structure contributes to an improvement in operational efficiency.

Figure 4:
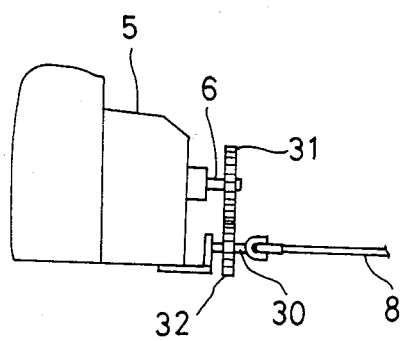
FIG. 4 is a vertical side view illustrating another embodiment of the present invention.

FIG. 4 shows another embodiment of the tractor according to the present invention. This embodiment is different from the previous embodiment in the respect of a gear drive mechanism disposed in the coupling portion connecting the output shaft 6 and the transmission shaft 8. The gear drive mechanism comprises an intermediate shaft 30 mounted parallel with the clutch output shaft 6, a first gear 31 mounted on the clutch output shaft 6, and a second gear 32 mounted on the intermediate shaft 30 and meshed with the gear 31. The intermediate shaft 30 is operatively connected to the transmission shaft 8 through a universal joint. According to the foregoing structure, the engine 1 and the transmission shaft 8 are interconnected through the gear drive mechanism, and the transmission shaft 8 and front wheel drive shaft 11 extend horizontally throughout the length thereof at substantially the same height from the ground. As a result, the step 14 is lowered and the whole structure thereof can be flat. It is preferable, in this case, to provide the gearbox 20 in a horizontal intermediate position between the transmission shaft 8 and the front wheel drive shaft 11. In FIG. 4, like references are affixed to like elements in the previous embodiment, these elements have the same functions and their description is omitted here.

Figure 5:
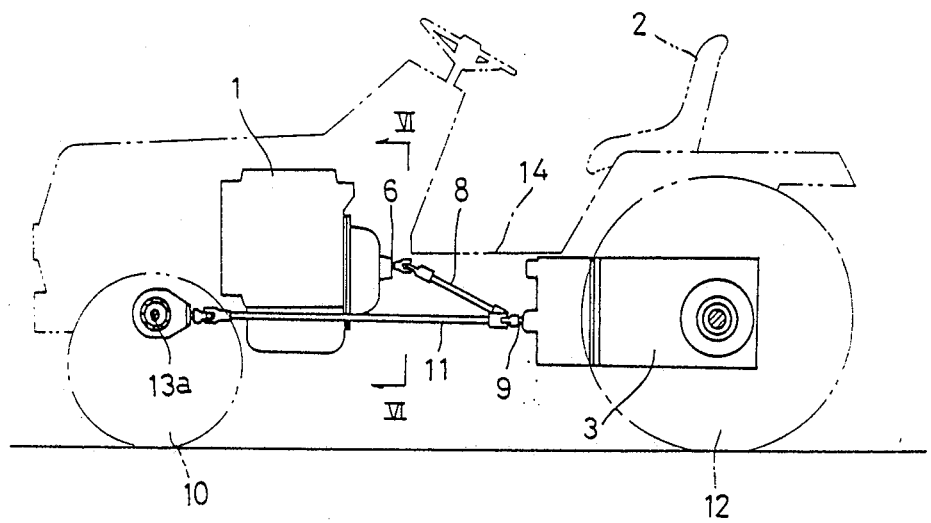
FIG. 5 is a vertical side view illustrating a further embodiment of the present invention.
Figure 6:
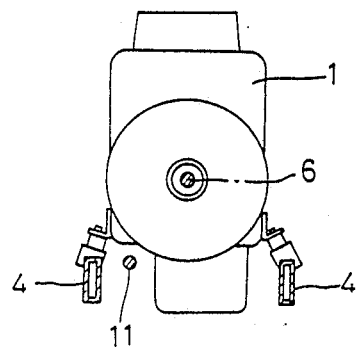
FIG. 6 is a section taken on line VI—VI of FIG. 5.

FIGS. 5 and 6 show an example where the features of this invention is applied to what is called a "midship tractor" which has an engine mounted between the front and rear wheels. According to this embodiment, the transmission shaft 8 extends to the engine 1 from the transmission input shaft 7 at a lower portion of the transmission case 3. The front wheel drive shaft 11 extends from the front wheel output shaft 9 at the lower portion of the transmission case 3, passing by a lateral side of a lower portion of the engine 1, to the front wheel axle 13a. The step 14 is provided for the operator above the transmission shaft 8 and front wheel drive shaft 11. Consequently, this structure also realizes a midship tractor defining a low and flat step which maintaining a sufficient level from the ground.

What is claimed is:
1. A frame type tractor comprising:
vehicle frames,
an engine mounted on a front region of the vehicle frames,
a transmission case housing a transmission and mounted on a rear region of the vehicle frames,
a transmission shaft for operatively connecting the engine to the transmission,
front and rear wheels driven by power changed by the transmission, the front wheels being steerable and disposed forwardly of the engine,
a steering mechanism for the front wheels, and
a front wheel drive shaft for operatively connecting the transmission to the front wheels,
wherein the transmission shaft extends from a lower portion of the transmission case to the engine, the front wheel drive shaft extends from the lower portion of the transmission case, passing by a lateral side of a lower portion of the engine, to the front wheels, and an operator's step is disposed above the transmission shaft and front wheel drive shaft.

2. A frame type tractor comprising:
vehicle frames;
an engine mounted on a front region of said vehicle frames;
a clutch having clutch output shaft means mounted on said engine;
a transmission case housing a transmission and mounted on a rear region of said vehicle frames, said transmission case having a transmission shaft input means and a front wheel shaft output means disposed in a lower front wall thereof;
a transmission shaft for operatively connecting said engine to said transmission, said transmission shaft extending rearward from said clutch output shaft means downwardly to said transmission shaft input means;
front and rear wheels driven by power changed by said transmission, said front wheels being steerable;
a steering mechanism for said front wheels; and
a front wheel drive shaft for operatively connecting said transmission to said front wheels, said front wheel drive shaft extending forward from said front wheel drive shaft output means downwardly to a front wheel axle, whereby said transmission shaft and front wheel drive shaft extend below a step provided for the operator.

3. A frame type tractor comprising:
vehicle frames;
an engine mounted on a front region of said vehicle frames;
a transmission case housing a transmission and mounted on a rear region of said vehicle frames;
a transmission shaft for operatively connecting said engine to said transmission;
front and rear wheels driven by power changed by said transmission, said front wheels being steerable;
a steering mechanism for said front wheels;
a front wheel drive shaft for operatively connecting said transmission to said front wheels;
said engine and said transmission shaft are interconnected by a gear drive mechanism; and
said transmission shaft and said front wheel drive shaft extend horizontally at substantially the same height from the ground throughout lengths thereof, whereby a substantially flat, wide step provided for an operator of the tractor can be disposed at a conveniently low height.

4. A frame type tractor comprising:
vehicle frames;
an engine mounted on a front region of said vehicle frames;
a transmission case housing a transmission and mounted on a rear region of said vehicle frames;
a transmission shaft for operatively connecting said engine to said transmission;
front and rear wheels driven by power changed by said transmission, said front wheels being steerable;
a steering mechanism for said front wheels;
a front wheel drive shaft for operatively connecting said transmission to said front wheels; and
said steering mechanism includes a gearbox disposed in an intermediate space formed between said transmission shaft and said front wheel drive shaft, whereby a substantially flat, wide step provided for an operator of the tractor can be disposed at a conveniently low height.

5. A frame type tractor comprising:
vehicle frames;
an engine mounted on a front region of said vehicle frames;
a transmission case provided with a transmission shaft input and a front wheel drive shaft output, said transmission case mounted on a rear region of said vehicle frames for housing a transmission;
a transmission shaft for operatively connecting said engine and said transmission;
front and rear wheels driven by power changed by said transmission, said front wheels being steerable;
a steering mechanism for steering said front wheels;
a front wheel drive shaft for operatively connecting said transmission and said front wheels; and
said transmission shaft input and said front wheel drive shaft output being disposed substantially parallel with each other in a lower region of said transmission case, said transmission shaft and said front wheel drive shaft extending from the respective input and output at angles adapted to allow said front wheel drive shaft to be disposed at a minimum level consistent with adequate ground clearance, whereby a substantially flat, wide step for an operator of the tractor can be disposed conveniently low directly above said transmission shaft and said front wheel drive shaft.

* * * * *